United States Patent [19]

Inoue et al.

[11] Patent Number: 5,712,684
[45] Date of Patent: Jan. 27, 1998

[54] VIEWING APPARATUS WITH VISUAL AXIS DETECTOR

[75] Inventors: Shunsuke Inoue, Yokohama; Hidekazu Takahashi, Isehara, both of Japan

[73] Assignee: Canon Kabushiki Kaisha, Tokyo, Japan

[21] Appl. No.: 624,201

[22] Filed: Apr. 3, 1996

Related U.S. Application Data

[63] Continuation of Ser. No. 226,339, Apr. 12, 1994, abandoned.

[30] Foreign Application Priority Data

Apr. 16, 1993 [JP] Japan ................................. 5-089866

[51] Int. Cl.$^6$ ............................................. H04N 5/232
[52] U.S. Cl. ............................ 348/341; 348/333; 396/382
[58] Field of Search ...................................... 348/341, 345, 348/335, 333; 354/400, 62; H04N 5/232

[56] References Cited

U.S. PATENT DOCUMENTS

| | | |
|---|---|---|
| 3,614,214 | 10/1971 | Cornsweet et al. |
| 4,452,517 | 6/1984 | Kohayakawa . |
| 4,828,381 | 5/1989 | Shindo .................... 354/62 X |
| 5,071,245 | 12/1991 | Fukuma et al. ............ 351/211 |
| 5,182,443 | 1/1993 | Suda et al. ............. 354/400 X |
| 5,225,862 | 7/1993 | Nagano et al. .......... 354/400 X |
| 5,335,035 | 8/1994 | Maeda ..................... 354/219 |

FOREIGN PATENT DOCUMENTS

| | | |
|---|---|---|
| 0189350 | 7/1986 | European Pat. Off. . |
| 0283749 | 9/1988 | European Pat. Off. . |
| 0373788 | 6/1990 | European Pat. Off. . |
| 3001244 | 7/1980 | Germany . |
| 1241511 | 9/1989 | Japan . |
| 2252432 | 10/1990 | Japan . |
| 431690 | 5/1992 | Japan . |

*Primary Examiner*—Wendy Garber
*Attorney, Agent, or Firm*—Fitzpatrick, Cella, Harper & Scinto

[57] ABSTRACT

A viewing apparatus exhibiting high performance and an image forming apparatus including the same. The viewing apparatus includes a projection optical system for projecting an image on a viewer's eye, a detector for detecting the refractive power of the viewer's eye, and an adjustor for adjusting the projection optical system so that the image is formed substantially on a viewer's eye fundus. The imaging apparatus includes an imager for forming an image of an object, a projection optical system for projecting the object image on the viewer's eye, a detector for detecting the refractive power of the viewer's eye, and an adjustor for adjusting the projection optical system so that the object image is formed substantially on the viewer's eye fundus in accordance with the refractive power of the viewer's eye.

14 Claims, 7 Drawing Sheets

VIEWING APPARATUS WITH VISUAL AXIS DETECTOR

This application is a continuation of application Ser. No. 08/226,339 filed Apr. 12, 1994, now abandoned.

BACKGROUND OF THE INVENTION

1. Field of the Invention

The present invention relates generally to a viewing apparatus and, especially, to automation of a diopter adjustment mechanism of a viewfinder of a silver halide film camera, an electronic still camera, a camcorder and a microscope, and the like.

2. Related Background Art

The remarkable advancement of putting a single-lens reflex camera into electronic form has been realized in recent years. Electronic versions of a focusing mechanism and an exposure mechanism have been sequentially developed. Recently, a so-called visual axis input autofocus camera has been developed in which the direction of the visual axis of the eye of the photographer is detected, and focusing at a gazing point is attained. FIG. 1 illustrates an apparatus disclosed in Japanese Patent Laid-Open Application No. 1-241511, the arrangement being such that a visual axis direction detecting unit is incorporated into the single-lens reflex camera, and focusing is performed to one of detected fields of a plurality of focus detection units 116. The visual axis detection unit includes elements 709 through 714. The numeral 709 indicates an eyepiece; numeral 710 denotes a visible transmission/infrared reflection dichroic mirror; numeral 711 represents a light projecting/receiving lens; numeral 712 stands for a half-mirror; numeral 713 designates an eyeball illumination light source; and numeral 714 is a sensor having a multiplicity of pixels. Provided further are a phototaking lens 115 and a flip-up mirror 117. A visual axis direction is obtained from mutual positions of a plurality of Purkinje images or the mutual positions of the first Purkinje image and the center of the pupil. The method of obtaining the visual axis direction has already been disclosed in the above Japanese Patent Laid-Open Application and the other documents, and, therefore, the explanation thereof will be omitted. In any case, the intention of the photographer is reflected in an photographed image by adopting a visual axis input system, and a higher-level photographic expression can be realized.

In conventional cameras, however, the optical system of the viewfinder is fixed, and hence the following defects arise irrespective of the magnitude of a visual acuity (or the eye refracting power) of the photographer.

In an ordinary camera and a video finder which do not use the visual axis input system, especially a myopic photographer (having a large eye refracting power) sees a blurred image of the finder and is therefore required to invariably wear spectacles. It is therefore difficult to view an object through the eyepiece, resulting in a failure of taking a picture of a desired image. Thus, it has not been feasible to reflect the photographer's intention in taking a photo or a video picture. A method has been developed of conpensating for the eye refracting power of the photographer by interposing a movable lens between the finder and the eye of the photographer. The position of the lens is, however, manually adjusted by the photographer when taking a picture. This method does not provide a large improvement in terms of labor.

Further, according to the visual axis input system shown in the conventional example, the photographer himself or herself has to be more clearly aware of which area to gaze at and what kind of image to take a picture of. Particularly when the photographer has myopia, a viewed image will be blurred. Accordingly, it is difficult to perform the photography making full use of the effectiveness of the visual axis input system.

SUMMARY OF THE INVENTION

It is a primary object of the present invention, which has been devised in the light of the problems inherent in the conventional art described above, to provide an viewing apparatus exhibiting high performance and an image forming apparatus including a viewing apparatus.

According to a first mode of the viewing apparatus of the present invention, the viewing apparatus comprises: a projection optical system for projecting an image on an eye of a viewer; detecting means for detecting the refracting power of the eye of the viewer; and means for adjusting the projection optical system in accordance with the detected refracting power so that the image is substantially formed on the eye fundus of the viewer.

According to a second mode of the viewing apparatus of this invention, the viewing apparatus comprises: a projection optical system for projecting an image on an eye of a viewer; detecting means for detecting the refracting power of the eye of the viewer; means for detecting a visual axis of the viewer; and means for adjusting the apparatus in accordance with the detected refracting power so that the image is substantially formed on the eye fundus of the viewer.

According to a first mode of the image forming apparatus of the present invention, the image forming apparatus comprising: means for forming an image of an object; a projection optical system for projecting the object image on an eye of a viewer; detecting means for detecting the refracting power of the eye of the viewer; and means for adjusting the projection optical system in accordance with the detected refracting power so that the image is substantially formed on the eye fundus of the viewer.

According to a second mode of the image forming apparatus of the present invention, the image forming apparatus comprises: means for forming an image of an object; a projection optical system for projecting the object image on an eye of a viewer; detecting means for detecting the refracting power of the eye of the viewer; means for detecting the visual axis of the viewer; and means for adjusting the apparatus in accordance with the detected refracting power so that the object image is substantially formed on the eye fundus of the viewer.

BRIEF DESCRIPTION OF THE DRAWINGS

Other objects and advantages of the present invention will become apparent during the following discussion in conjunction with the accompanying drawings, in which.

DESCRIPTION OF THE PREFERRED EMBODIMENTS

Figure 1:
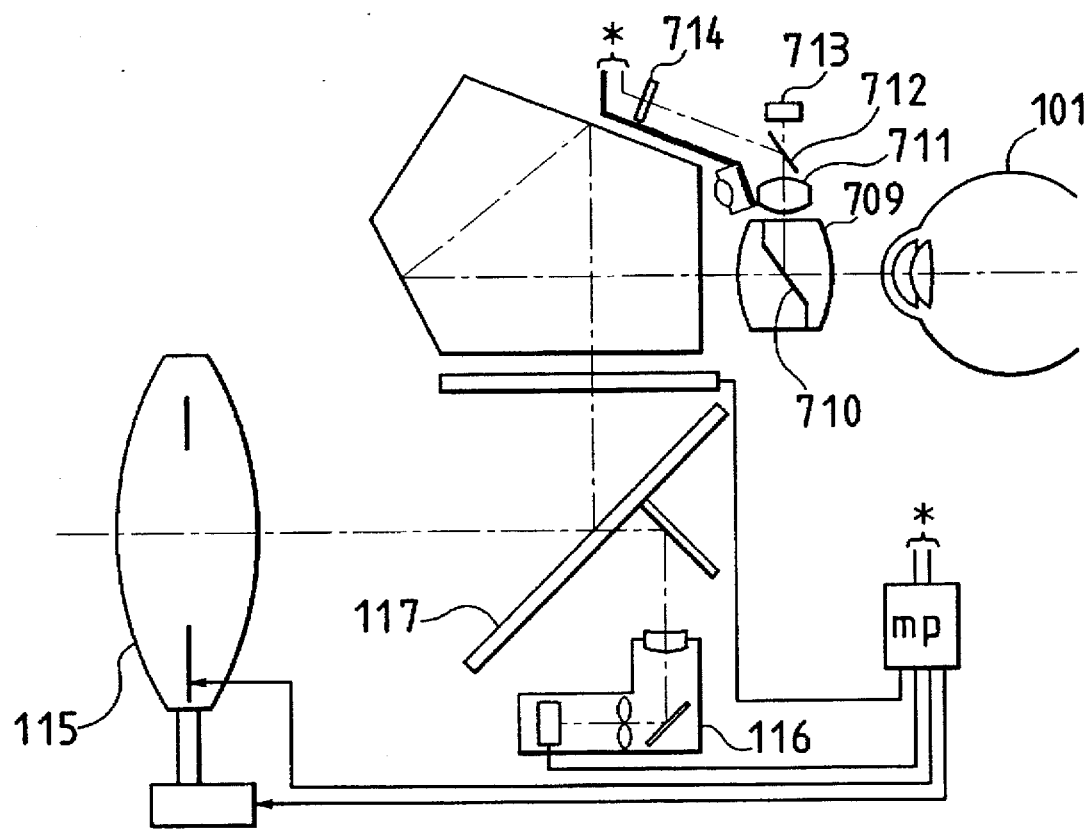
FIG. 1 is a view illustrating a conventional example.
Figure 2:
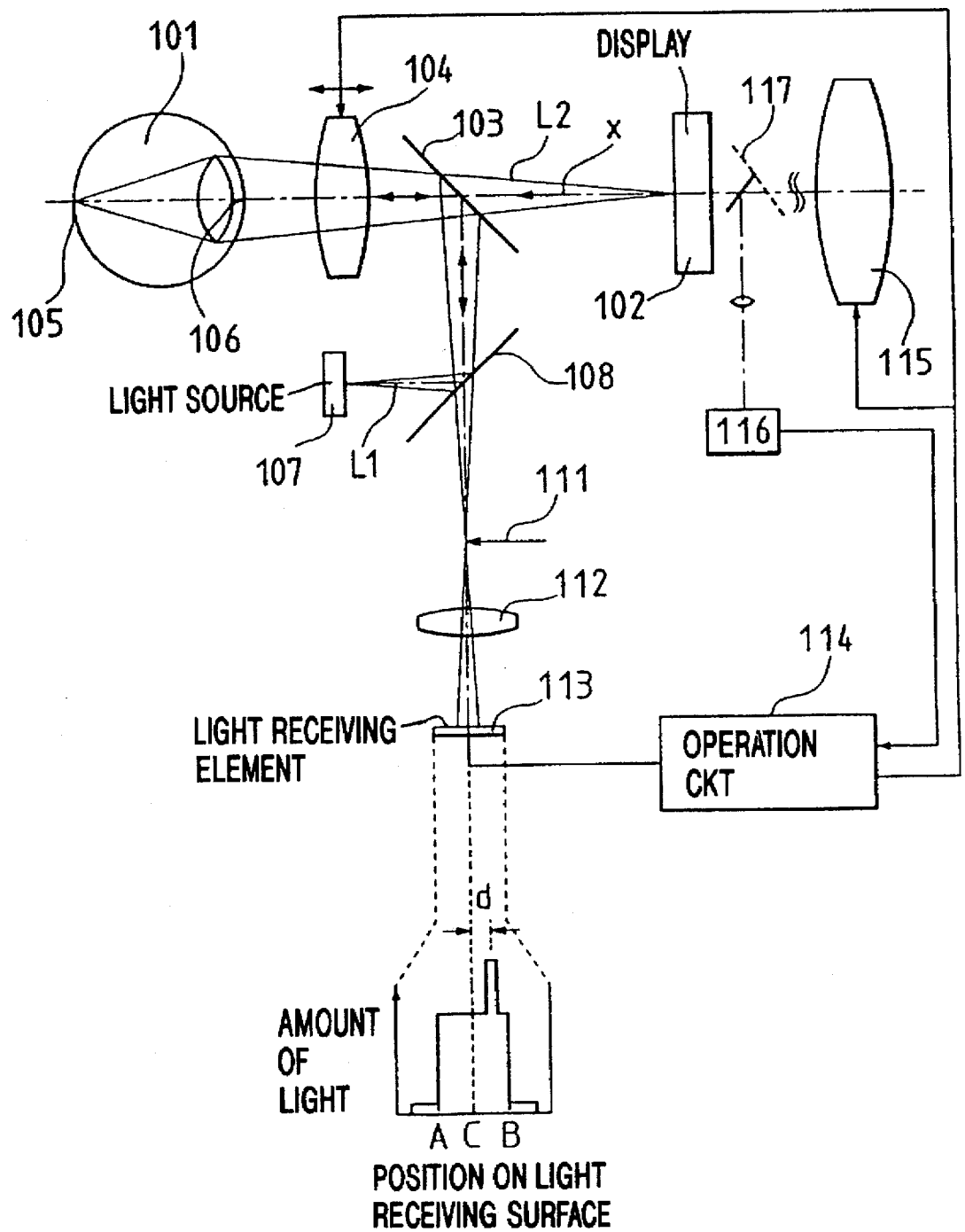
FIG. 2 is a view of an optical layout for illustrating a first embodiment.
Figure 3:
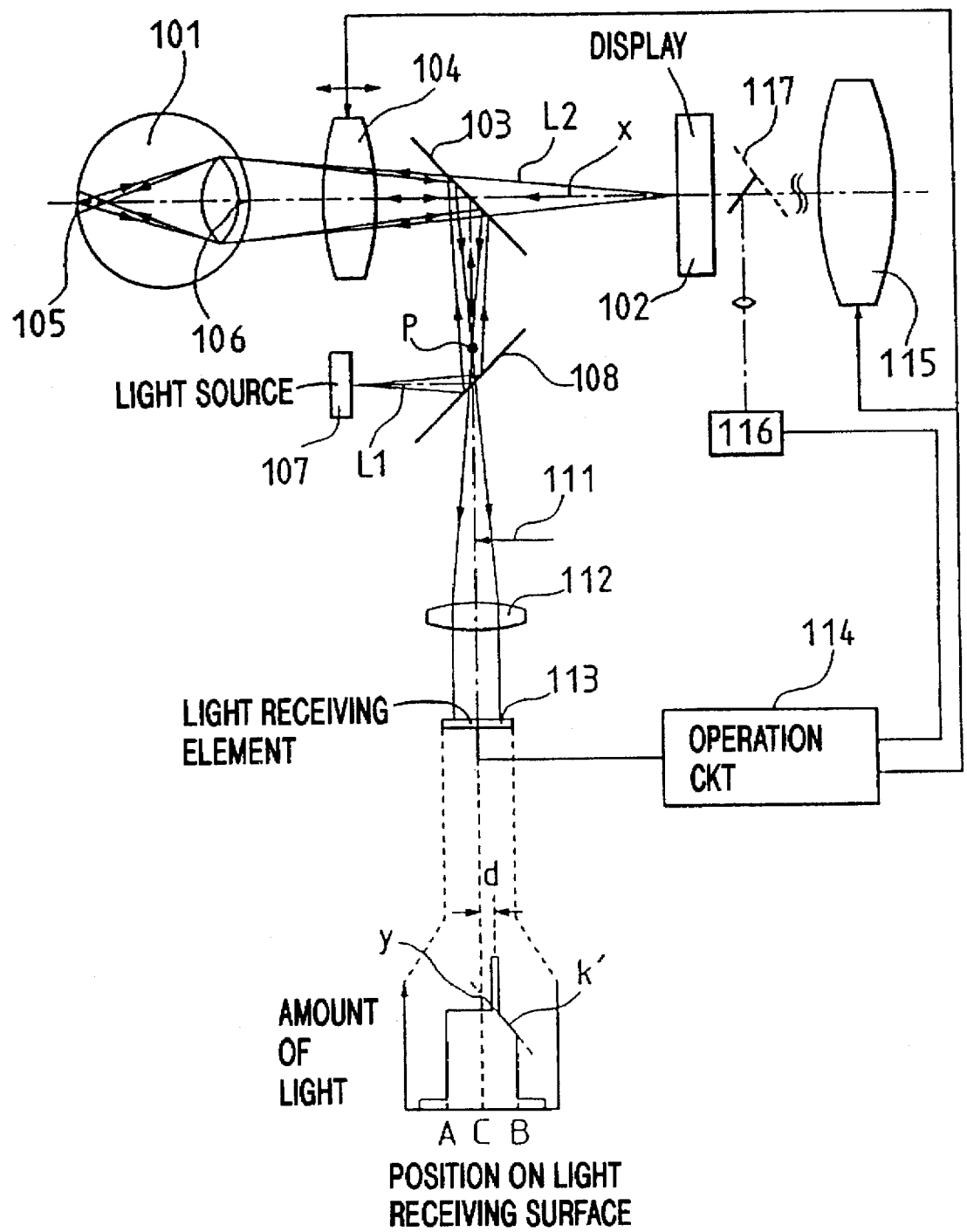
FIG. 3 is a view showing rays of light in a minus diopter in accordance with a first embodiment.
Figure 4:
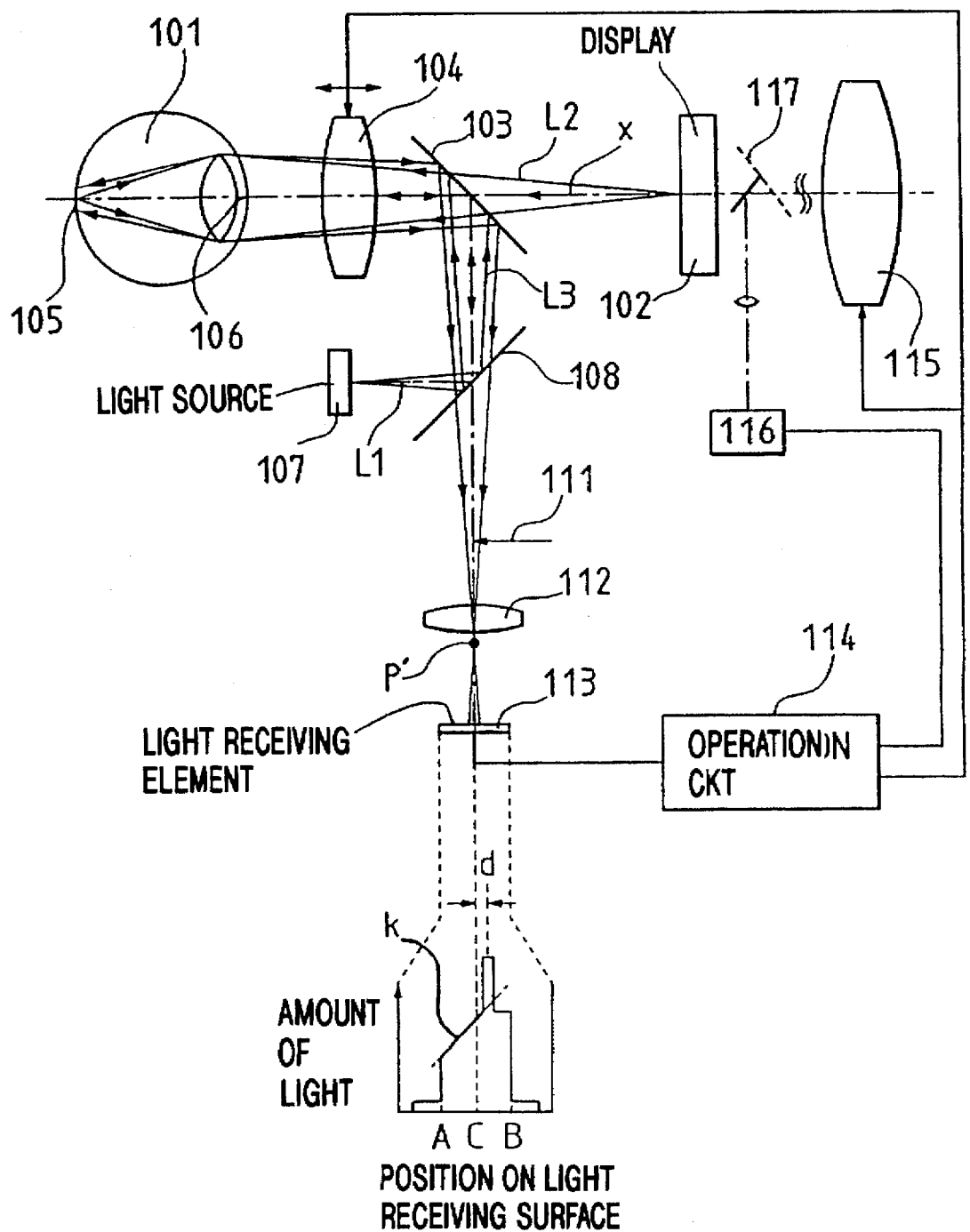
FIG. 4 is a view showing the rays of light in a plus diopter in accordance with the first embodiment.

FIGS. 2 to 4 are views of configurations in which the present invention is applied to a single-lens reflex camera but illustrating a first embodiment, wherein principal elements of the camera are conceptually depicted.

Referring to FIGS. 2 through 4, an eye 101 of a photographer views a display device 102 provided in a finder. Disposed accordingly on the same optical-axis x are the display device 102 such as, e.g., a focusing plate, an infrared light/visible light reflection half-mirror 103 and a diopter adjustment lens (eyepiece) 104. The eye 101 has a crystalline lens for imaging an outside scene on eye fundus (retina) 105. Another half-mirror 108 is disposed on the optical path bent by the half-mirror 103 with respect to the eye. The half-mirror 108 reflects a light beam $L_1$ from a light source 107 such as an infrared LD toward the half-mirror 103. Located on a transmission side of the half-mirror 108 are a light shielding member 111 for measuring an eye refracting power, an imaging lens 112 and a light receiving element 113 having a multiplicity of pixels. An output of the light receiving element 113 is inputted to an operation circuit 114 for calculating a visual axis direction and the eye refracting power of the eye 101. A focus lens 115 is driven in back-and-forth directions along the optical axis x on the basis of an operation result of the circuit 114. The focus lens 115 constitutes a part or the entirety of a phototaking lens. This embodiment is based on an assumption of using an ordinary camera, and, therefore, the phototaking lens is optically connected to the display device. In a video camera which will be mentioned later, however, a projection lens is electrically connected to the display device. A part of the object beams from the phototaking lens are guided to a device 116 for detecting the focus at a plurality of points through an optical distributor. The object beams are further guided, when a shutter is opened, to a film or a solid-state image pick-up device. A flip-up mirror 117 optically connects the projection lens to the finder.

Next, the operation of this embodiment will be explained.

The light source 107 emits a light beam 110 having a wavelength of 800–1200 nm. The beam 110 is reflected by the half-mirror 108 and is further reflected by the dichroic type half-mirror 103. The beam is thereafter guided onto the eye fundus 105 via the diopter adjustment lens 104 and a pupil 106. An image of the light source 107 is formed on the eye fundus 105. The diopter adjustment lens 104 is located in a fiducial position. In this case, if the eye refracting power (visual acuity) of the eye 101 is the reference diopter value (reference refracting power), positions of the light source 107, the half-mirrors 103, 108, the diopter adjustment lens 104 and the eye 101 are set to focus the image of the light source 107 on the eye fundus 105. The beam reflected from the eye fundus 105 is reflected by the half-mirror 103 and travels through the half-mirror 108. The beam is guided through the imaging lens 112 onto the light receiving element 113. The light receiving element 113 is a one-dimensional or two-dimensional sensor array. The light receiving element 113 is a semiconductor-used CCD or a bipolar amplification type sensor or an image pickup tube or an aggregation of these two or more elements. A light receiving surface of the light receiving element 113 is disposed in a position optically conjugate to the position of the pupil 106 of the eye 101 with respect to the imaging lens 104 and an objective lens 112. The light shielding member 111 is defined as an edge-like member for shielding one side of the beam. The light shielding member 111 is disposed in a position conjugate to the light source 107 with respect to the half-mirror 108. Outputs of the light receiving element 113 undergo an arithmetic operation in the operation circuit 114. The visual axis direction and the eye refracting power of the eye 101 are calculated. A display surface of the display device 102 is imaged on the eye fundus 105. Thereafter, the diopter adjustment lens 104 is driven back and forth on the basis of mainly the calculated eye refracting power. Mainly, based on the calculated result of the visual axis direction and an output of a focus detector, the focus lens 115 of a phototaking apparatus is driven to a desired position. The diopter adjustment lens 104 may be constructed so that the whole eyepiece is moved, bug a part of the eyepiece is also allowed to move.

Shown in a lower portion of FIG. 2 is a light intensity distribution on the light receiving element 113 when a diopter value of the eye 101 is substantially equal to the reference diopter value. The ordinate indicates an amount of light, while the abscissa indicates a position on the light receiving surface (sensor).

Next, a method of measuring the eye refracting power and the visual axis direction of the eye 101 will be explained based on the above construction.

FIG. 3 illustrates the behavior of the light beam when the diopter value of the eye 101 has a minus number in comparison with the reference diopter value (i.e., the photographer has a myopia). In this case, the image of the light source 107 is formed in front of the eye fundus 105. The eye fundus 105 is illuminated with light beams. A light beam reflected at one point on the optical axis among these beams is converged at a position P in front of the light shielding member 111. Hence, a right half of the beam is shielded by the light shielding member 111. At this time, the light amount distribution on the light receiving element 113 is as depicted in the lower portion of the Figure. A central position C of the pupil is obtained from positions A, B corresponding to the edges of the pupil 106. The visual axis direction can be calculated based on an amount of displacement d, from the central position C, of a peak position of the Purkinje image which gives the maximum output. The details thereof are stated in, e.g. Japanese Patent Laid-Open Application No. 1-241511. Further, a light amount of the right-half-shielded beam among the outputs decreases as it approaches the edges. This inclination is one-dimensionally approximated and is defined as term k'. There are obtained k' and a point y at which a line of extrapolation of this inclination line intersects the optical axis (central axis). A diopter value of the eye can be calculated therefrom. Based on this diopter value, it is possible to calculate the degree to which the diopter adjustment lens is shifted to form the image of the display device 102 on the eye fundus 105. In the case of the myopia, the diopter adjustment lens may be moved by this shift amount away from the eye. The detailed calculation of the eye refracting power is explained in, e.g., Japanese Patent Laid-Open Application No. 2-252432.

FIG. 4 illustrates the behavior of the light beam when the diopter value of the eye 101 has a plus number in comparison with the reference diopter value (i.e. the photographer has a hyperopia). In this instance, the image of the light source 107 is formed to the rear of the eye fundus 105. The eye fundus 105 is illuminated with light beams. A light beam reflected at one point on the optical axis among these beams is converged at a position P' in rear of the light shielding member 111. Hence, the right half of the beam is shielded by the light shielding member 111. It follows that a left half of the beam is shielded on the light receiving element 113, and the light amount distribution on the light receiving element 113 is as depicted in the lower portion of the figure. The method of obtaining the visual axis direction and the diopter value is the same as in the case of FIG. 3. Thus, it is possible to make a distinction between myopia and hyperopia, depending on the sign (plus/minus) of the diopter value. A direction of shift of the diopter adjustment lens 104 can be determined. In the case of hyperopia, the diopter adjustment lens may be made close to the eye.

Note that driving the diopter adjustment lens may involve the use of an ultrasonic motor, a pulse driving motor or a stepping motor, etc.. Further, the diopter is adjusted by changing the focal length of the lens with a variable focus lens technology capable of electronically controlling the focal length of the lens instead of causing a mechanical shift.

FIG. 2 shows a state of behavior of the light beams when the diopter adjustment lens is located in a desired position in this manner. The image of the light source 107 is formed on the eye fundus. The image of reflection is formed just at the position of the light shielding member. Obtained is an uniform light amount distribution on the light receiving element 113. This indicates that the diopter value is 0.

Figure 5:
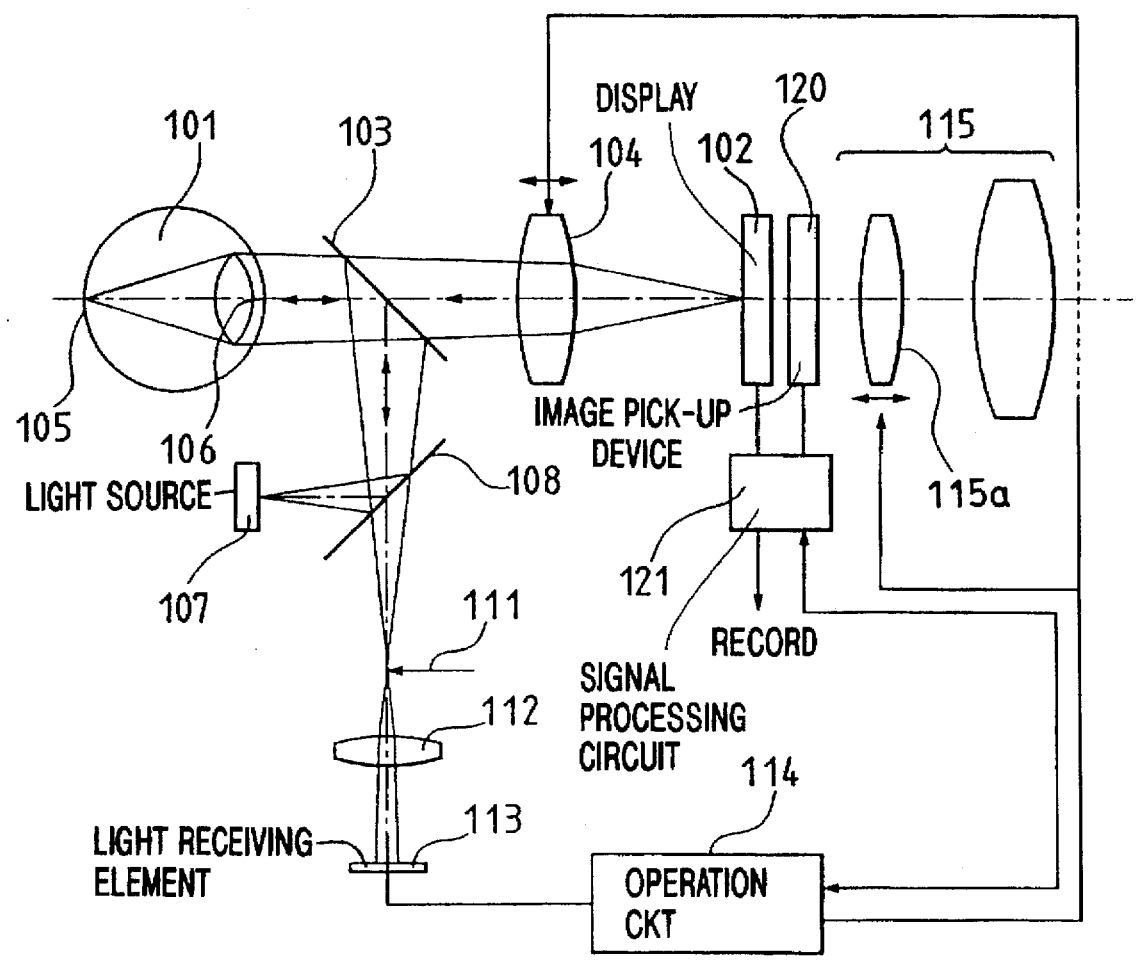
FIG. 5 is a view of an optical layout for illustrating a second embodiment.

FIG. 5 is a view of a second embodiment of the present invention but illustrating an example where this invention is applied to a camcorder. Referring to FIG. 5, the same members as those in the preceding embodiment are marked with like numerals. However, a phototaking lens 115 comprises a focusing lens 115a. The numeral 120 designates a solid-state image pick-up device. Indicated at 121 is a signal processing circuit, and a video picture is displayed on the display device 102 such as a liquid crystal display. Further, the signal processing circuit 121 and the operation circuit 114 cooperate to detect a defocus direction of the phototaking lens with respect to a subject within an area in the visual axis direction according to a so-called TV-AF system. The focusing lens 115a is then driven.

In accordance with this embodiment, the diopter adjustment lens 104 is separated from an optical system for detecting the visual axis and measuring the eye refracting power. There is provided no diopter adjustment lens between the eye 101 and the light source 107. Correspondingly, the distances between the eye 101 and the half-mirror 103 and between two pieces of half-mirrors are more or less different from those in the first embodiment. However, the methods of measuring the diopter value and detecting the visual axis direction are the same as those in the preceding embodiment. Further, the direction of driving the diopter adjustment lens is also the same.

This embodiment is superior to the first embodiment because a larger amount of light incident on the light receiving element 113 can be taken due to the lack of a lens reducing the amount of light between the light source 107 and the eye 101; and there are improved both the detection of visual axis direction and the measuring of the accuracy of the eye refracting power.

Figure 6:
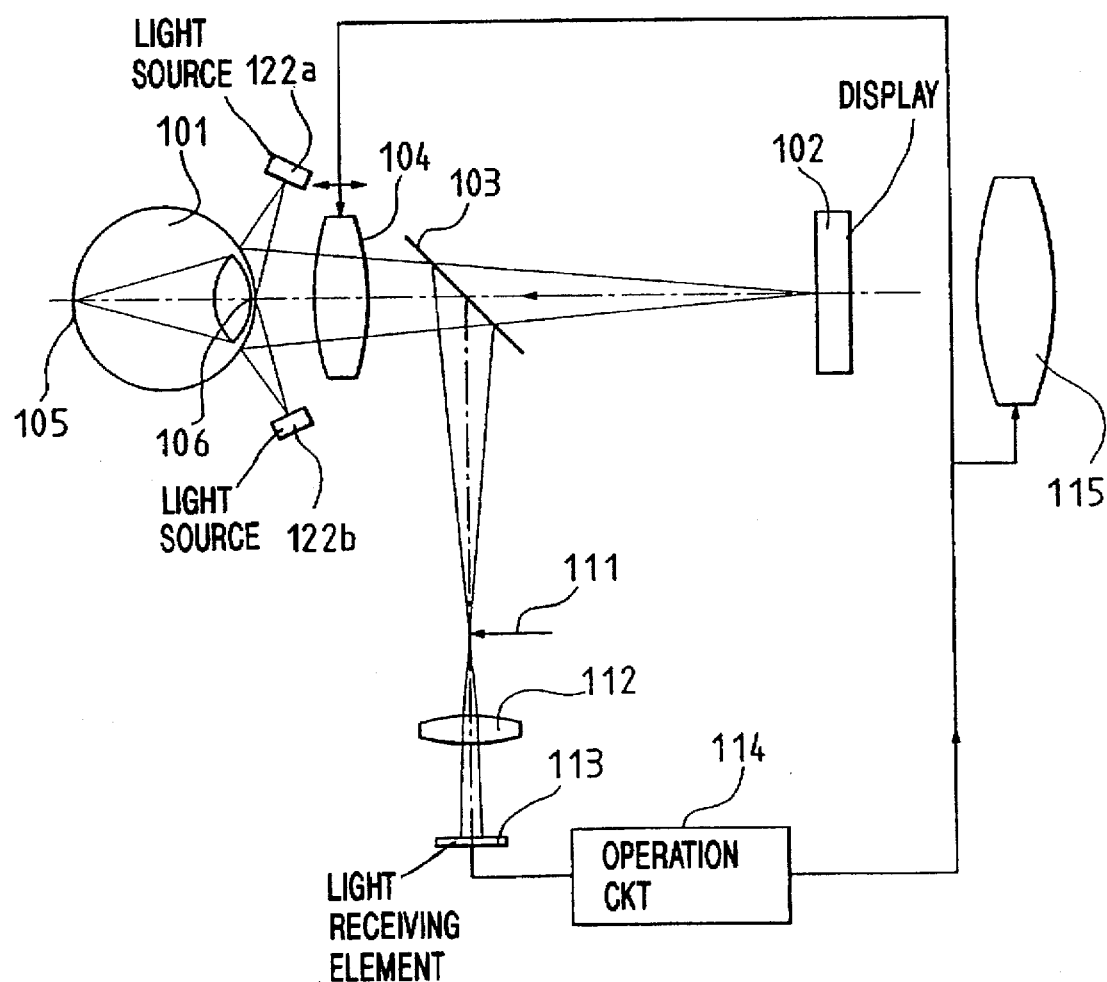
FIG. 6 is a view of an optical layout for illustrating a third embodiment.

FIG. 6 illustrates a third embodiment of the present invention. Referring to FIG. 6, the illustrations of the members 116, 117, 120, 121 of FIGS. 2 and 5 are omitted.

The arrangement of this embodiment is not that the light source emits the illumination light via the half-mirror 108 but that light sources 122a, 122b disposed in the vicinity of the eye emit the illumination light, with a single piece of half-mirror omitted. The two light sources are provided in positions showing a point symmetry with respect to the optical axis x in order to make the light amount distribution uniform. Identified with the methods in the two embodiments discussed above are the visual axis detecting method, the eye refracting power measuring method, the focusing method of the display device 102 and the focusing method of the object.

In accordance with this embodiment, one half-mirror can be omitted, and, therefore, the configuration of the entire optical system can be made smaller than in the first embodiment. Hence, this largely contributes to down-sizing of the apparatus. Further, the light sources are disposed in close proximity to the eye, and hence the larger detection light amount can be used. This leads to an advantage wherein the visual axis detection and the measurement of the eye refracting power can be attained with a higher accuracy.

Figure 7:
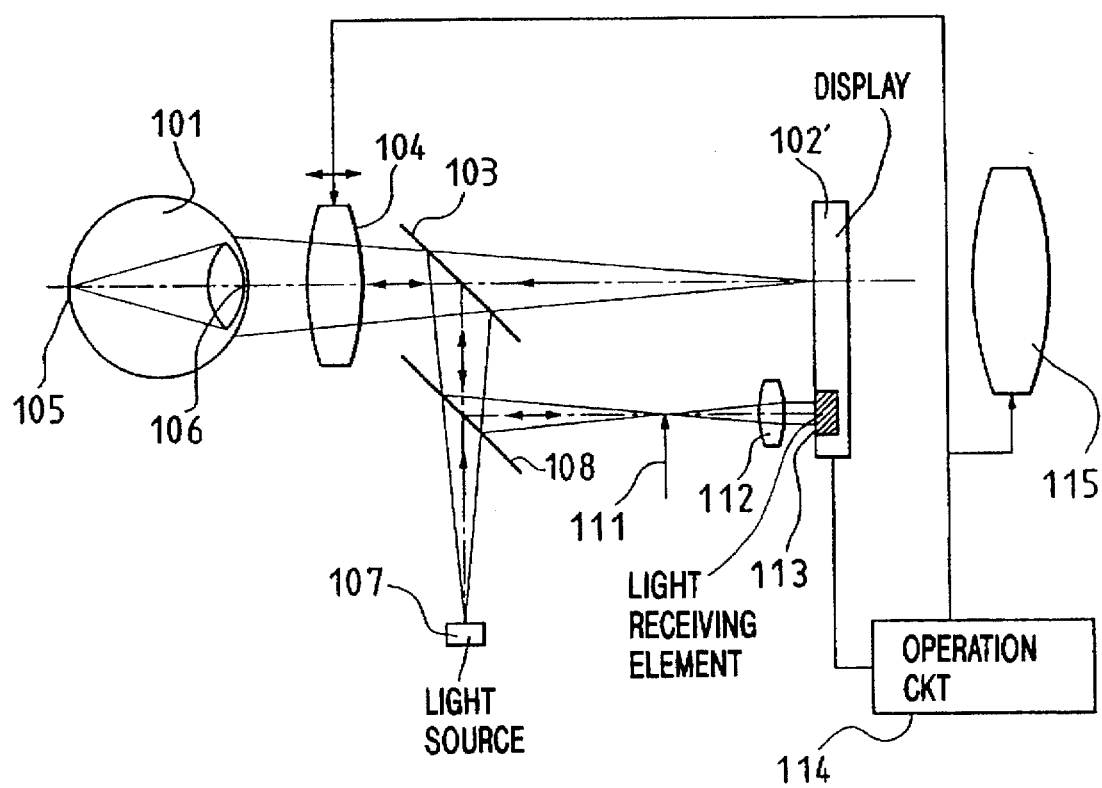
FIG. 7 is a view of an optical layout for illustrating a fourth embodiment.

FIG. 7 illustrates a fourth embodiment of the present invention.

The display device involves the use of, e.g., a liquid crystal panel, and, in a manufacturing process thereof, a semiconductor light receiving element can be easily manufactured. An image formed by the light beam of an LED light source 107 reflected from the eye fundus is formed on the light receiving element. For this purpose, a part of the beams are guided via the half-mirror 108 onto a portion of a display device 102'. The light shielding member 111 for measuring the eye refracting power and the objective lens 112 are disposed between the display device 102' and the half-mirror 108. The visual axis detecting method and the eye refracting power measuring method are the same as those in the three preceding embodiments.

In this embodiment, the effect remains unchanged even by using a beam splitter as a substitute for the half-mirror. A plasma display and an EL element, etc. can be also employed.

What is operated by the output of the visual axis detecting device is not confined to the focal adjustment but may be a selection of a photometric mode, and so on.

The present invention is applicable to a microscope and a finder of a monitoring apparatus for an industrial use other than a camera and a video camera.

It is apparent that, in this invention, a wide range of different working modes can be formed based on the invention without deviating from the spirit and scope of the invention. This invention is not restricted by its specific working modes except being limited by the appended claims.

What is claimed is:

1. An observing apparatus having a projecting optical system for projecting an object image onto an eye of an observer, comprising:

image detecting means for receiving a first reflection light from a fundus of the eye;

controlling means for detecting the refracting power of the eye based on an output of said image detecting means, said controlling means including adjusting means for adjusting said observing apparatus so that the object image is substantially focused on the fundus of the eye based on a result of detection of the refracting power of the eye, wherein said image detecting means is disposed at a position in optical conjugation with a pupil of the eye such that a first image is formed in front of said image detecting means by the first reflection light from the eye fundus and a second image is formed on said image detecting means by a second reflection light from the pupil of the eye and from the neighborhood of the pupil;

wherein said observing apparatus changes the distribution of the intensity of light on said image detecting means due to the first and second reflection light according to the refracting power of the eye and the direction of the visual axis of the eye; and wherein said controlling means detects both the refracting power of the eye and the direction of the visual axis of the eye based on the distribution of the intensity of light represented by the output of said image detecting means.

2. An apparatus according to claim 1, wherein said adjusting means has means for moving the projection optical system in an optical-axis direction.

3. An apparatus according to claim 1, wherein the projecting optical system has an optical system of a variable focal length.

4. An apparatus according to claim 1, wherein said controlling means first adjusts said observing apparatus so that the refracting power of the eye is detected based on the first image and the object image is substantially focused on the fundus of the eye based on a result of detection of the refracting power of the eye and, second detects the direction of the visual axis of the eye of the observer based on the second image.

5. An apparatus according to claim 1, wherein said apparatus has an infrared light source for emitting an illumination light for illuminating the eye in order to form the first and second reflection light.

6. An image forming apparatus comprising:

an observing apparatus comprising:

a projecting optical system for projecting an object image onto an eye of an observer;

image detecting means for receiving a first reflection light from a fundus of the eye; and controlling means for detecting the refracting power of the eye based on an output of said image detecting means, said controlling means including adjusting means for adjusting said observing apparatus so that the object image is substantially focused on the fundus of the eye based on a result of detection of the refracting power of the eye, wherein said image detecting means is disposed at a position in optical conjugation with a pupil of the eye such that a first image is formed in front of said image detecting means by the first reflection light from the eye fundus and a second image is formed on said image detecting means by a second reflection light from the pupil of the eye and the neighborhood of the pupil;

wherein said observing apparatus changes the distribution of the intensity of light on said image detecting means due to said first and second reflection light according to the refracting power of the eye and the direction of the visual axis of the eye;

wherein said controlling means detects both the refracting power of the eye and the direction of the visual axis of the eye based on the distribution of the intensity of light represented by the output of said image detecting means; and an image forming device having image forming means for forming the object image.

7. An image forming apparatus according to claim 6, further comprising means for adjusting said image forming device in response to a signal from said controlling means representing the detected visual axis of the eye.

8. An image forming apparatus according to claim 7, wherein said adjusting means has means for moving at least one phototaking lens element of said image forming device.

9. An apparatus according to claim 7, further comprising a substrate in which are formed a liquid crystal display device for displaying the object image projected by said projecting optical system and a member for converting the first and second images into electrical signals.

10. An image forming apparatus according to claim 6, further comprising a focusing plate, wherein said projection optical system projects the object image on said focusing plate again on the eye of the observer.

11. An apparatus according to claim 6, wherein said adjusting means has means for moving said projection optical system in an optical-axis direction.

12. An apparatus according to claim 6, wherein said projecting optical system has a variable focal length optical system.

13. An apparatus according to claim 6, wherein said controlling means first adjusts said observing apparatus so that the refracting power of the eye is detected based on the first image and the object image is substantially focused on the fundus of the eye based on a result of detection of the refracting power of the eye and, second detects the direction of the visual axis of the eye of the observer based on the second image.

14. An apparatus according to claim 6, wherein said apparatus has an infrared light source for emitting an illumination light for illuminating the eye in order to form the first and second reflection light.

* * * * *

UNITED STATES PATENT AND TRADEMARK OFFICE
CERTIFICATE OF CORRECTION

PATENT NO. : 5,712,684  Page 1 of 2
DATED : January 27, 1998
INVENTOR(S) : INOUE ET AL.

It is certified that error appears in the above-identified patent and that said Letters Patent is hereby corrected as shown below:

SHEET 4 OF DRAWINGS

In Fig. 4, box 114, "OPERATION)N" should read --OPERATION--.

COLUMN 1

Line 43, "an" should read --a--.
Line 48, "a" should be deleted.
Line 52, "especially" should be deleted.

COLUMN 2

Line 11, "an" should read --a--.
Line 33, "prising:" should read --prises--.

COLUMN 3

Line 20, "LD" should read --light source--.
Line 36, "are" should read --is--.
Line 62, "semiconductor-used" should read --semiconductor--.

UNITED STATES PATENT AND TRADEMARK OFFICE
CERTIFICATE OF CORRECTION

PATENT NO. : 5,712,684
DATED : January 27, 1998
INVENTOR(S) : INOUE ET AL.

It is certified that error appears in the above-identified patent and that said Letters Patent is hereby corrected as shown below:

COLUMN 4

Line 15, "bug" should read --but--.

COLUMN 5

Line 22, "an" should read --a--.

Signed and Sealed this

Third Day of August, 1999

*Attest:*

Q. TODD DICKINSON

*Attesting Officer*     *Acting Commissioner of Patents and Trademarks*